Patented Oct. 24, 1939

2,176,876

UNITED STATES PATENT OFFICE 2,176,876

METHOD FOR THE PREPARATION OF COMPOSITE PIGMENTS

Hugh V. Alessandroni, New York, N. Y., assignor, by mesne assignments, to National Lead Company, New York, N. Y., a corporation of New Jersey No Drawing. Original application August 24, 1935, Serial No. 37,775. Divided and this application November 8, 1938, Serial No. 239,511

3 Claims. (Cl. 134—78)

My invention relates to novel methods for the manufacture of pigments, particularly to the manufacture of that type of pigment known as "composite" in which a primary pigment is intimately associated with one or more secondary pigments.

The objects of my invention include novel methods for the manufacture of composite pigments which methods possess many advantages over those of the prior art.

The present application is a division of my copending application, Serial No. 37,775, filed August 24, 1935, Patent No. 2,176,875, issued October 24, 1939.

Pigments are said to be of the composite type when they consist of two or more individual components. Thus, lithopone, a zinc sulfide-barium sulfate composition, is a composite pigment. So also are the well-known, so-called coalesced composite titanium dioxide pigments of the prior art in which there is present besides titanium dioxide, either barium or calcium sulfate. Titanated lithopone, a tertiary pigment composed of titanium dioxide, zinc sulfide and barium sulfate is also of the composite type. In all composite pigments there is present at least one material which may be regarded as the primary pigment. Such a material possesses relatively good pigment properties such as, for example, tinting strength, hiding power, opacity, etc. In addition to the primary pigment there is also present in composite pigments at least one other material which may be regarded as a secondary pigment. Such a material possesses pigment properties relatively inferior to those of the primary pigment. In composite pigments the function of the secondary pigment is referred to as that of an "extender", a "carrier" or "diluent" for the primary pigment, athough, in the present invention, the secondary pigment may itself possess definite pigment properties.

By "primary pigment" as used by me to designate a component of a composite pigment prepared according to the herein described method, I refer to that component which possesses superior pigment properties as compared with the other component or components of the composite pigment and which, whether it be a simple or composite material, is dispersed as a simple material in one suspension. Thus, the primary pigment component may consist of a simple material such as titanium dioxide, zinc sulfide, or it may consist of a coprecipitated composite pigment prepared by prior art methods, such as titanium dioxide-barium sulfate pigment. In this latter example the coprecipitated calcined composite titanium dioxide-barium sulfate pigment is to be considered as the primary pigment since it possesses pigment properties superior to those of the basic lead carbonate. Conversely, "secondary pigment" as used by me indicates the component or components of a composite pigment prepared according to the present invention which possesses pigment properties inferior to those possessed by the primary pigment constituent. The term "secondary pigment" as used by me would thus include not only the so-called extenders, e. g. barium sulfate, calcium sulfate, asbestine, etc., but also certain other materials possessing relatively good pigment properties, e, g, basic lead carbonate, zinc oxide, etc., when these latter are used in conjunction with a material having even better pigment properties as, for example, titanium dioxide, zinc sulfide, etc.

For the most part, composite pigments have been prepared in the past by methods which involve a coprecipitation of the primary and secondary pigments and a subsequent mutual calcination. Lithopone, for example, is prepared by a double decomposition reaction which occurs when solutions of zinc sulfate and barium sulfide are brought together. The resulting precipitate of zinc sulfide and barium sulfate is then calcined. Composite titanium dioxide pigments are generally prepared by one of two alternative procedures: (1) by adding the secondary pigment, e. g., barium or calcium sulfate, to a titanium solution and precipitating the titanium-oxygen compounds by hydrolysis; or, (2) by adding a solution of a salt, the sulfate of which constitutes the secondary pigment, e. g. calcium or barium chloride, to a titanium sulfate solution thus forming the secondary pigment, in situ, and then precipitating the titanium-oxygen compounds by hydrolysis. The mixed precipitates of titanium-oxygen compounds and secondary pigment are then calcined together. Such methods produce pigments concerning which it has been said that the titanium dioxide is precipitated on and coalesced with the secondary pigment.

Among the reasons for this final or penultimate calcination step may be mentioned the following: (a) to effect changes primarily in the crystalline structure of certain of the components of the pigment; (b) to effect or complete a coalescence between the primary and secondary constituents of the composite pigment; (c) to dehydrate one or more of the constituents, if they exist in the coprecipitated mixture as hydroxides or hydrates, etc.; (d) to eliminate volatile impurities.

As a result of this calcination, the pigment properties of the primary pigment, such as tinting strength, covering power, etc., are developed to an optimum degree. The secondary pigment, on the other hand, is essentially unaltered and unimproved. It is evident, therefore, that the prior art methods involve considerable unnecessary treatment of the secondary pigment and, as a consequence of this unnecessary treatment, increased manufacturing costs.

I have now discovered novel methods whereby composite pigments such as those comprising a primary pigment and one or more secondary pigments may be prepared without the necessity of resorting to coprecipitation and mutual calcination. My novel methods are particularly suited to the preparation of composite pigments superior to those manufactured by prior art methods and at a much lower cost of production. These novel methods comprise the coflocculation of a mixture consisting of a dispersed suspension of a primary pigment and separately dispersed suspensions of one or more secondary pigments after which the coflocculated composite pigment is washed, dried and puverized.

By the tem "coflocculation" as used by me throughout this description of my invention, I mean the mutual coagulation and integration of pigment particles from a mixture consisting of a dispersed aqueous suspension of a primary pigment and one or more separately-dispersed aqueous suspensions of secondary pigments.

My novel coflocculation methods of preparing composite pigments are clearly distinguishable from piror art precipitation methods for preparing composite pigments.

In methods involving precipitation, substasces in substantially molecular solution undergo, under suitable conditions, physico-chemical changes which result in the formation of a second, usually difficultly soluble, phase. Fluocculation, on the other hand, involves only the integration or coagulation of small particles of a dispersed substances to larger particles or flocs. In the former phenomenon the molecules are said to be condensed to minute ultra-microscopic crystals from which in turn larger particles are developed by what is known as "grain-growth". In the latter phenomenon particles which may even be so small as to approach colloidal dimension are integrated to larger, visible macroscopic flocs. In the former the larger particles result from a physico-chemical interaction between the ultramicroscopic crystals and the surrounding solution while in the latter the larger particles result merely from an integration and adherence of a number of smaller particles. Whereas, precipitation implies the transition of substances from the solution phase, through the colloidal phase to the solid phase; fluocculation, as used by me, implies merely an agglomeration of small particles to form larger ones.

Hydrolysis, with the formation of hydrous oxides, and double decomposition or metathesis, with the formation of insoluble salts, are typical condensation reactions involving precipitation. Thus, for example, hydrous titanium oxide is formed by hydrolysis of a titanyl sulfate solution while barium sulfate is formed by a double decomposition reaction between a solution of a soluble barium compound and a solution of a soluble sulfate.

In practicing my invention, a dispersed suspension of the primary pigment is first prepared by means of a dispersing agent. Separate individual suspensions of the secondary pigment or pigments are prepared, also by means of dispersing agents. These suspensions are then mixed and coflocculation accomplished by one of two procedures (1) by means of an added coagulating agent; (2) as a result of an interaction between the dispersing agent selected for the primary pigment and the dispersing agent or agents selected for the secondary pigment or pigments.

The dispersion of the primary and secondary pigments may conveniently be effected by grinding or milling the individual pigments with a suitable quantity of water, for example, a quantity equal in weight to that of the pigment. The dispersing agent may be contained in the water, either in solution if it be water-soluble, or in suspension, if it be insoluble in water; or it may be added prior to or during the milling or grinding operation, as desired.

The function of a dispersing agent is not completely understood. It is believed that the disintegration of aggregates of primary particles which results from the use of a suitable dispersing agent is due to a strong, usually preferential absorption of ions. It has been suggested that through the use of such an agent a similar electrical charge is impinged upon the individual particles of the dispersed or suspended substance, the effect of which is to set up a mutual repulsion between the individual particles, thus preventing coagulation. Furthermore, a dispersing agent may effect a reduction in the size of the particles of a dispersed or suspended material by partially dissolving them. A substance may also function as a dispersing agent, although with obvious limited application, if it succeeds in nullifying or destroying the agglomerating effect of some other substance present in the material.

Although these general hypotheses are not conclusive, they furnish, in many instances, a guide to the proper selection of the dispersing agents to be employed in the practice of my invention.

Among the materials which exert a dispersing effect on various primary and secondary pigments and which are, therefore, useful in the practice of my invention may be mentioned: the carbonates and hydroxides of alkali metals, e. g. NaOH, $Na_2CO_3$, $K_2CO_3$; ammonium hydroxide, $NH_4OH$; alkali metal silicates, e. g. $Na_2SiO_3$; sulfides, e. g. $H_2S$, certain inorganic salts, e. g. $PbCl_2$ and $BaCl_2$; acidic halides of tri- and tetravalent elements, e. g. Fe, Th, $Tl$, Ce, $Al$, Zr, etc.; metallic soaps, e. g. those of oleic, stearic, palmitic or lauric acid; the ammonium soaps of sufonted aliphatic oils, e. g. the ammonium soap of sulfonated castor oil; sulfonated fatty oils or acids, e. g. Turkey red oil; alkyl- substituted aryl sulfonic acids and their salts, e. g. isopropylnaphthalene sulfonic acid and the sodium salt thereof; certain emulsifying agents such as saponin, trihydroxyethylamine, etc.

According to the first alternative method of my invention, any suitable dispersing agents may be employed in preparing the dispersed suspension of primary pigment and that of the secondary pigment or pigments, and coflocculation may be brought about by the addition, to the mixed suspensions, of a coagulating agent, for example, magnesium sulfate. Strongly acidic or basic substances such as sulfuric acid or sodium hydroxide are often effective as coagulating agents.

It will be readily seen that the selection of a suitable coagulating agent will be determined largely from a consideration of the factors involved in preparing the dispersed suspensions. When added to mixed suspensions which are in a stable condition, it should function in a manner similar to that of an antipathetic dispersing agent, i. e. neutralize or discharge the stabilizing influences of the dispersing agents contained in the mixed suspensions. The most effective coagulating agents are electrolytes and as such furnish in solution two types of ions: (a) one which may be adsorbed and cause dispersion, and (b) one which tends to neutralize or discharge the dispersing ion and cause flocculation. When dispersed pigment particles are coflocculated from mixed suspensions by means of a coagulating agent which is an electrolyte, the flocculating power of that electrolyte may be considered as that concentration which furnishes a sufficient quantity of those ions which tend to neutralize not only the original stabilizing ions of the dispersing agents but also those of the electrolyte itself.

Therefore an electrolyte with a strongly adsorbable dispersing or stabilizing ion will necessarily require higher concentration in order to effect coflocculation than an electrolyte with a weakly adsorbable stabilizing or dispersing ion.

Briefly stated, a coagulating agent should have a stabilizing ion which is only slightly adsorbable; that is, the influence of the ion having the same charge as that impinged upon the particles of the dispersed substances should be small, whereas that of the flocculating or opposite ion should be great.

Although these considerations are useful in selecting coagulating agents and, to a certain extent, antipathetic dispersing agents for the practice of my invention I do not limit myself only to coagulating agents or antipathetic dispersing agents selected in accordance therewith.

The second of the two above noted methods of carrying out my invention is to choose the dispersing agents for the primary pigment and secondary pigment or pigments respectively, so that mutual coflocculation occurs without the aid of a coagulating agent when the suspensions containing these dispersing agents are mixed together. Properly chosen dispersing agents will, when suspensions containing them are mixed together, nullify or mutually counteract the dispersing effect of each other and may be referred to as being antagonistic or antipathetic to each other.

It is practically impossible to list all the combinations of dispersing agents which may be employed in carrying out my invention according to this method. Certain considerations are, however, helpful in arriving at a proper selection of antipathetic dispersing agents, for example, where a dispersion has been prepared by means of a dispersing agent furnishing preferentially adsorbed ions, an antipathetic dispersing agent will furnish ions capable of neutralizing or discharging the dispersing ions of the first dispersing agent. The ions of the antipathetic dispersing agent which fulfill this function are usually of opposite electrical potential. Consequently, acidic dispersing agents may be regarded as being antipathetic to basic dispersing agents and vice versa. For example, a mutual coflocculation will result when a suspension of titanium dioxide, prepared by means of the acidic salt, aluminum chloride, is mixed with a suspension of barium sulfate prepared with the basic substance, sodium silicate.

In general, as will be readily ascertained from this description of my invention and particularly from the specific embodiments thereof, dispersion of the primary or secondary pigments may be effected by the use of only a small amount of dispersing agent. When it is desired to bring about the coflocculation of the composite pigments as a result of neutralizing or antipathetic properties of the respective dispersing agents, it may be advantageous to use substantially stoichiometric proportions of the agents selected. However, if it be desired to coflocculate by means of a coagulant such consideration is not important.

After the pigment particles have been coflocculated from the mixed suspensions they may be separated from the supernatant liquor by any suitable means such as decantation or filtration or both. The dispersing agents as well as the coagulating agents are thus practically completely removed. The coflocculated pigment particles may then be washed to remove any residual soluble dispersing agent, coagulating agent, or reaction products resulting from an interaction between antipathetic dispersing agents, and then dried. In those cases where an insoluble dispersing agent had been used the small amount remaining in the pigment after removal of the supernatant liquor and washing will exert no detrimental effect on the quality of the product. When dried, coflocculated pigments prepared according to the methods of the present invention may be readily pulverized in order to render them suitable for use in the industrial arts.

There is obtained, as a result of my novel coflocculation processes, an integration of particles of the primary and secondary pigments originally dispersed in which the particles are intimately associated in such relationship that, after washing, drying and pulverizing, they possess pigment properties which are comparable to those possessed by the coalesced composite pigments of the prior art. There is involved, I believe, in the integration resulting from my coflocculation process an association as intimate and/or an affinity between the primary pigment particles and those of the secondary pigment or pigments which is at least as strong as that resulting from the co-precipitation and conjoint calcination methods of the prior art for the preparation of the so-called coalesced composite pigments. For these reasons I employ the term "integrated" as descriptive of the association of pigment particles coflocculated as above described.

This application as filed is a division of my application Serial No. 37,775, filed August 24, 1935, Patent No. 2,176,875, issued October 24, 1939, the claims of which are restricted to the first method above set forth wherein zinc sulfide is employed as the primary pigment with claims specific thereto, in which the secondary pigment is barium sulfate, sodium silicate is the dispersing agent and magnesium sulfate is the coagulating agent.

In said original application, Serial No. 37,775, filed August 24, 1935, Patent No. 2,176,875, issued October 24, 1939, I have broadly claimed the first of the two methods above described wherein dispersing agents are employed which are not antipathetic to one another and in which a coagulating agent is used for effecting coflocculation of the dispersed pigment particles. In addition to the broad claims to this process specific claims are included to the use of titanium dioxide and composite titanium dioxide pigments as the primary pigments and barium sulfate and basic carbonate white lead as the secondary pigments, to sodium silicate and lead chloride as dispersing agents, and to magnesium sulfate as the coagulating agent, all as will appear in the claims thereof.

Application Serial No. 239,512, filed November 8, 1938, Patent No. 2,176,877, issued October 24, 1939, comprises another divisional application of the said original application Serial No. 37,775, filed August 24, 1935, Patent No. 2,176,875, issued October 24, 1939, and in that divisional application I have broadly claimed therein the second method above set forth wherein antipathetic dispersing agents are employed for the primary and secondary pigments respectively, and in which coflocculation of the dispersed pigment particles takes place upon simply mixing the dispersed suspensions. In addition to the broad claims to this process specific claims are included to the use of titanium dioxide, composite titanium dioxide pigments, and zinc sulfide as the primary pigments and barium sulfate, calcium sulfate, and basic carbonate white lead as the secondary pigments, to aluminum chloride, sodium silicate and hydrogen sulfide as dispersing agents, all as will appear in the claims thereof.

It is to be specifically understood that no abandonment of any of the claims not presented in Serial No. 37,775, the original application, now Patent No. 2,176,875, issued October 24, 1939, or in this, or the other divisional application above set forth is to be incurred by the order in which the Letters Patent hereon and on the said two divisional applications may issue or by the fact that all of the claims are not presented in a single patent, reservation being hereby specifically made to present the claims in this and in the two other applications as just above set forth.

In this application, with the understanding and reservation as above set forth I now present the following specific example; it being understood, of course, that my invention is not in any way to be restricted to this example as below given which is for illustrative, but not limitative, purposes.

EXAMPLE NO. I

*Zinc sulfide-barium sulfate pigment*

100 lbs. of commercial zinc sulfide pigment are dispersed by milling for about 2 hours in 30 gallons of water in the presence of 1.5 lbs. of sodium silicate. 233 lbs. of barium sulfate, ground natural barytes, are milled with 33 gallons of water in the presence of 2.66 lbs. of sodium silicate, for about 2 hours.

The two dispersions are then mixed and about 2.4 lbs. of magnesium sulfate in aqueous solution are added to coflocculate the suspended particles of zinc sulfide and barium sulfate. The coflocculated pigment particles are filtered, washed and dried at about 100° C., after which a pulverization may be employed.

The product of this example is an integrated composite pigment comparable to lithopone of similar composition prepared by prior art methods.

It will be seen that my methods are admirably suited to the preparation of pigments of any desired predetermined proportions. In determining the desired proportions of primary and secondary pigments the use to which the composite pigment is to be put should be taken into consideration. If the requirements are such as to demand a pigment having a high tinting strength, good opacity, etc., a relatively larger amount of primary pigment will be used.

Lithopone pigments prepared according to my coflocculation methods are preeminently adapted for all purposes where at the present time lithopones made by prior art methods are used.

The foregoing detailed description has been given for clearness of understanding and no undue limitations should be deduced therefrom, but the appended claims should be construed as broadly as possible in view of the prior art.

I claim:

1. A process for the manufacture of a composite zinc sulphide pigment which comprises dispersing as the primary pigment zinc sulphide in aqueous suspension by means of a small amount of a dispersing agent, separately dispersing a secondary pigment in aqueous suspension by means of a small amount of a dispersing agent which is not antipathetic to the dispersing agent for the zinc sulphide, mixing the separately dispersed suspension and coflocculating the zinc sulphide and secondary pigment by means of a coagulating agent, separating the coflocculated pigments thus integrated from the supernatant liquor, and washing, drying and pulverizing the same.

2. A process for the manufacture of a composite zinc sulphide-barium sulphate pigment which comprises dispersing zinc sulphide in aqueous suspension by means of a small amount of a dispersing agent, separately dispersing barium sulphate in aqueous suspension by means of a dispersing agent which is not antipathetic to the dispersing agent for the zinc sulphide, mixing the separately dispersed suspension and coflocculating the dispersed pigments by means of a coagulating agent, separating the coflocculated pigments thus integrated from the supernatant liquor and washing, drying and pulverizing the same.

3. A process for the manufacture of a composite zinc sulphide-barium sulphate pigment, which comprises dispersing zinc sulphide by means of a small amount of sodium silicate, separately dispersing barium sulphate by means of a small amount of sodium silicate mixing the two suspensions and adding thereto magnesium sulphate in aqueous solution, separating the coflocculated pigments thus integrated from the supernatant liquor and washing, drying and pulverizing the same.

HUGH V. ALESSANDRONI.